(12) United States Patent
Myers et al.

(10) Patent No.: US 11,375,732 B2
(45) Date of Patent: Jul. 5, 2022

(54) PEARLESCENT PIGMENT COMPOSITIONS AND METHODS FOR MAKING AND USING THE SAME

(71) Applicant: Sensient Colors LLC, St. Louis, MO (US)

(72) Inventors: Gale D. Myers, St. Louis, MO (US); Jeffrey R. Plodzien, Florissant, MO (US); Leo H. Otto, St. Louis, MO (US)

(73) Assignee: Sensient Colors LLC, St. Louis, MO (US)

( * ) Notice: Subject to any disclaimer, the term of this patent is extended or adjusted under 35 U.S.C. 154(b) by 509 days.

(21) Appl. No.: 16/154,566

(22) Filed: Oct. 8, 2018

(65) Prior Publication Data

US 2019/0274330 A1    Sep. 12, 2019

Related U.S. Application Data

(63) Continuation of application No. 11/957,036, filed on Dec. 14, 2007, now abandoned.

(60) Provisional application No. 60/870,046, filed on Dec. 14, 2006.

(51) Int. Cl.

| | | |
|---|---|---|
| *A23G 1/30* | (2006.01) | |
| *A23P 20/10* | (2016.01) | |
| *A23L 29/262* | (2016.01) | |
| *A23L 5/47* | (2016.01) | |
| *A23G 3/34* | (2006.01) | |
| *A23G 4/06* | (2006.01) | |
| *A23G 9/32* | (2006.01) | |

(52) U.S. Cl.
CPC .............. *A23G 1/305* (2013.01); *A23G 3/343* (2013.01); *A23G 4/062* (2013.01); *A23G 9/322* (2013.01); *A23L 5/47* (2016.08); *A23L 29/262* (2016.08); *A23P 20/105* (2016.08)

(58) Field of Classification Search
CPC ............ A23L 5/47; A23G 4/063; A23G 9/322
See application file for complete search history.

(56) References Cited

U.S. PATENT DOCUMENTS

| | | | |
|---|---|---|---|
| 3,087,828 A | 4/1963 | Linton | |
| 3,087,829 A | 4/1963 | Linton | |
| 3,477,864 A | 11/1969 | Tuji | |
| 3,553,001 A | 1/1971 | Kohlschutter et al. | |
| 3,635,735 A | 1/1972 | Patil | |
| 3,981,984 A | 9/1976 | Signorino | |
| 4,115,315 A | 9/1978 | Marinelli | |
| 4,302,440 A | 11/1981 | John et al. | |
| 4,513,019 A | 4/1985 | Branq et al. | |
| 4,543,370 A | 9/1985 | Porter et al. | |
| 4,576,646 A | 3/1986 | Branco et al. | |
| 4,636,261 A | 1/1987 | Heinze | |
| 4,665,648 A | 5/1987 | Branco et al. | |
| 4,683,256 A | 7/1987 | Porter et al. | |
| 4,731,269 A | 3/1988 | Hansen et al. | |
| 4,753,790 A | 6/1988 | Silva et al. | |
| 4,780,326 A | 10/1988 | Stemmler et al. | |
| 4,816,298 A | 3/1989 | Alderman et al. | |
| 4,842,848 A | 6/1989 | Saita et al. | |
| 4,880,636 A | 11/1989 | Franz | |
| 4,931,285 A | 6/1990 | Edgren et al. | |
| 4,993,137 A | 2/1991 | Muto et al. | |
| 5,006,362 A | 4/1991 | Hilborn | |
| 5,059,248 A | 10/1991 | Signorino et al. | |
| 5,393,333 A | 2/1995 | Trouve | |
| 5,411,746 A | 5/1995 | Signorino et al. | |
| 5,435,840 A | 7/1995 | Hilborn | |
| 5,441,564 A | 8/1995 | Vogt | |
| 5,470,581 A | 11/1995 | Grillo et al. | |
| 5,480,479 A | 1/1996 | Signorino | |
| 5,514,384 A | 5/1996 | Signorino | |
| 5,591,455 A | 1/1997 | Signorino | |
| 5,595,592 A | 1/1997 | Signorino et al. | |
| 5,611,851 A | 3/1997 | Deluca et al. | |
| 5,662,732 A | 9/1997 | Kelley et al. | |
| 5,681,382 A | 10/1997 | Kokubo | |
| 5,858,078 A | 1/1999 | Andes et al. | |
| 5,885,342 A | 3/1999 | Gale et al. | |
| 6,019,831 A | 2/2000 | Schmidt et al. | |

(Continued)

FOREIGN PATENT DOCUMENTS

| | | |
|---|---|---|
| AU | 765514 | 2/2000 |
| BE | 1005912 | 3/1994 |

(Continued)

OTHER PUBLICATIONS

"European Parliament and Council Directive No. 94/36/EC of Jun. 30, 1994 on colours for use in foodstuffs," (Jun. 30, 1994) 17 pages.
"European Parliament and Council Directive No. 95/2/EC of Feb. 20, 1995 on food additives other than colours and sweeteners," (Feb. 20, 1995) 56 pages.
Assignment from Universal Foods corporation to Warner-Jenkinson Company, Inc. dated Apr. 25, 1991 (3 pages).
Assignment from Charles A. Signorino to Universal Foods Corporation dated Dec. 15, 1990 (3 pages).

(Continued)

*Primary Examiner* — Felicia C Turner
(74) *Attorney, Agent, or Firm* — Michael Best & Friedrich LLP

(57) ABSTRACT

A method of imparting pearlescence to a food product that includes applying a ready-to-use dispersion to a food product using confectionary panning, where the ready-to-use dispersion includes a pearlescent pigment, a cellulose derivative in an amount sufficient to enhance viscosity of the dispersion and impart a barrier coat to the food product, and a wax in an amount sufficient to impart a gloss to the food product. A method of incorporating a pearlescent pigment into a food product that includes applying a dispersion to a food product using panning, where the dispersion includes a pearlescent pigment, a viscosity enhancer, a fluid carrier, and a gloss agent.

27 Claims, No Drawings

(56) References Cited

U.S. PATENT DOCUMENTS

| | | | |
|---|---|---|---|
| 6,080,426 A | 6/2000 | Amey et al. |
| 6,139,962 A | 10/2000 | Herget et al. |
| 6,245,323 B1 | 6/2001 | Christie et al. |
| 6,267,810 B1 | 7/2001 | Pfaff et al. |
| 6,291,551 B1 | 9/2001 | Kniess et al. |
| 6,294,010 B1 | 9/2001 | Pfaff et al. |
| 6,334,893 B1 | 1/2002 | Pfaff et al. |
| 6,420,473 B1 | 7/2002 | Chittamuru et al. |
| 6,448,323 B1 | 9/2002 | Jordan et al. |
| 6,471,762 B1 | 10/2002 | Deluca, Jr. et al. |
| 6,488,756 B1 | 12/2002 | Schoen et al. |
| 6,495,163 B1 | 12/2002 | Jordan |
| 6,508,876 B1 | 1/2003 | Bernhardt et al. |
| 6,511,672 B2 | 1/2003 | Tan et al. |
| 6,517,628 B1 | 2/2003 | Pfaff et al. |
| 6,626,989 B1 | 9/2003 | DeLuca, Jr. et al. |
| 6,627,212 B2 | 9/2003 | Uzunian et al. |
| 6,632,275 B1 | 10/2003 | Schoen et al. |
| 6,727,308 B2 | 4/2004 | Kniess et al. |
| 6,773,499 B2 | 8/2004 | Schoen et al. |
| 6,783,584 B2 | 8/2004 | Takahashi |
| 6,902,609 B2 | 7/2005 | Steffenino et al. |
| 7,118,622 B2 | 10/2006 | Mazzella et al. |
| 7,169,471 B1 | 1/2007 | Dreher et al. |
| 7,172,803 B2 | 2/2007 | Raupach et al. |
| 7,226,503 B2 | 6/2007 | Anselmann et al. |
| 7,264,670 B2 | 9/2007 | Ruger et al. |
| 7,485,183 B2 | 2/2009 | Hochstein et al. |
| 7,604,862 B2 | 10/2009 | Ambrosius et al. |
| 7,731,993 B2 | 6/2010 | Berkson et al. |
| 2001/0021404 A1 | 9/2001 | Uhlemann et al. |
| 2003/0177950 A1 | 9/2003 | Schoen et al. |
| 2004/0018232 A1 | 1/2004 | Uzunian et al. |
| 2004/0166211 A1 | 8/2004 | Gesford et al. |
| 2004/0166214 A1 | 8/2004 | Gesford et al. |
| 2004/0180110 A1 | 9/2004 | Mistry |
| 2004/0191198 A1 | 9/2004 | Hochstein et al. |
| 2004/0202755 A1 | 10/2004 | Myers et al. |
| 2004/0244640 A1 | 12/2004 | Vogt et al. |
| 2004/0247675 A1 | 12/2004 | Gruber |
| 2005/0008735 A1 | 1/2005 | Pearce |
| 2005/0013902 A1 | 1/2005 | Pearce |
| 2005/0031775 A1 | 2/2005 | Signorino et al. |
| 2005/0100640 A1 | 5/2005 | Pearce |
| 2005/0147724 A1 | 7/2005 | Schweinfurth |
| 2005/0257716 A1 | 11/2005 | Mazzella et al. |
| 2006/0005742 A1 | 1/2006 | Moeschl et al. |
| 2006/0040042 A1 | 2/2006 | Signorino et al. |
| 2006/0275528 A1 | 12/2006 | Collins et al. |
| 2006/0277694 A1 | 12/2006 | Kleen et al. |
| 2006/0280705 A1 | 12/2006 | Bruechert et al. |
| 2007/0048416 A1 | 3/2007 | Uzunian et al. |
| 2007/0207927 A1 | 9/2007 | Rosa et al. |
| 2007/0298149 A1 | 12/2007 | Schweinfurth |
| 2008/0014321 A1 | 1/2008 | Schweinfurth et al. |
| 2008/0145493 A1 | 6/2008 | Myers et al. |
| 2008/0274198 A1 | 11/2008 | Schweinfurth |
| 2010/0029788 A1 | 2/2010 | Pelesko et al. |

FOREIGN PATENT DOCUMENTS

| | | |
|---|---|---|
| BG | 109308 | 3/2007 |
| CA | 2451851 | 1/2003 |
| CA | 2567490 | 12/2005 |
| DE | 19618564 | 11/1997 |
| DE | 19823866 | 12/1999 |
| DE | 19831869 | 1/2000 |
| DE | 19917388 | 10/2000 |
| DE | 102005010468 | 9/2006 |
| EP | 0133827 | 3/1985 |
| EP | 0318314 | 5/1989 |
| EP | 0698346 | 2/1996 |
| EP | 0960911 | 12/1999 |
| EP | 1094721 | 5/2001 |
| EP | 1469042 | 10/2004 |
| EP | 1484050 | 12/2004 |
| EP | 1541623 | 6/2005 |
| FR | 2660317 | 10/1991 |
| GB | 371396 | 4/1932 |
| GB | 408079 | 4/1934 |
| GB | 535138 | 3/1941 |
| GB | 559858 | 3/1944 |
| GB | 581129 | 10/1946 |
| GB | 598115 | 2/1948 |
| GB | 695507 | 8/1953 |
| GB | 697846 | 9/1953 |
| GB | 1069853 | 5/1967 |
| GB | 1073366 | 6/1967 |
| GB | 1157574 | 7/1969 |
| GB | 1279769 | 6/1972 |
| GB | 1280664 | 7/1972 |
| GB | 1295901 | 11/1972 |
| GB | 1338563 | 11/1973 |
| GB | 1373648 | 11/1974 |
| GB | 1429491 | 3/1976 |
| GB | 2065691 | 7/1981 |
| GB | 2242420 | 10/1991 |
| GB | 2315399 | 2/1998 |
| GB | 2360925 | 10/2001 |
| IT | 1145278 | 11/1986 |
| WO | WO91/02033 | 2/1991 |
| WO | WO91/14729 | 10/1991 |
| WO | WO92/11002 | 7/1992 |
| WO | WO93/08237 | 4/1993 |
| WO | WO94/10853 | 5/1994 |
| WO | WO95/27003 | 10/1995 |
| WO | WO95/27004 | 10/1995 |
| WO | WO97/17409 | 5/1997 |
| WO | WO97/43346 | 11/1997 |
| WO | WO98/56261 | 12/1998 |
| WO | WO99/61529 | 12/1999 |
| WO | WO00/03609 | 1/2000 |
| WO | WO00/25603 | 5/2000 |
| WO | WO02/090448 | 11/2002 |
| WO | WO03/002149 | 1/2003 |
| WO | WO03/063616 | 8/2003 |
| WO | WO2004/012515 | 2/2004 |
| WO | WO2004/080193 | 9/2004 |
| WO | WO2005/113686 | 12/2005 |
| WO | WO2005/115920 | 12/2005 |
| WO | WO2006/042744 | 4/2006 |
| WO | WO2007/057111 | 5/2007 |
| WO | WO2008/042802 | 4/2008 |
| WO | WO2008/076902 | 6/2008 |

OTHER PUBLICATIONS

Bernard, B.K. et al., "Toxicology and carcinogenesis studies of dietary titanium dioxide-coated MICA in male and female Fischer 344 rats," J. Toxicol. Envir. Health (1990) 29:417-429.
Candurin, Product Specifications from Merck Kga-A (Aug. 1996) 19 pages.
Candurin, QC test procedures (Jul. 1996) 10 pages.
Colorcon, "Coatings/Polishes," (2005), http://www.colorcon.com/food/coat_polish/index.html, 1 page.
Colorcon, "Opadry® fx™. An immediate release, pearlescent, film coating system from Colorcon," (2005) 5 pages.
Colorcon, "Pearlescent Coatings," (2005) http://www.colorcon.com/food/pearlicoat/index.html, 1 page.
Colorcon, "Pearlicoat™ Pearlescent Coating Systems," (2003) 4 pages.
Commission of European Communities, "Commission Directive 95/45/EC of Jul. 26, 1995 laying down specific purity criteria concerning colours for use in foodstuffs," (Jul. 26, 1995) 2-41.
Courtaulds Chemicals, "Celacol P 5/6" product data sheet (Dec. 13, 1993) 1 page.
EM Industries, Inc., a subsidiary of Merck, "Color additive petition" to the FDA (Apr. 6, 1998) 15 pages.
Hawley's Condensed Chemical Dictonary, Twelfth Edition, Richard J. Lewis, Sr., Van Nostrand Reinhold Co., New York (1993) p. 923.
Hogan, J.E., "Aqueous versus organic solvent film coating," Int. J. Pharm. Tech. & Prod. Mfr. (1982) 3(1):17-20.

(56) References Cited

OTHER PUBLICATIONS

Jones, D.S. et al., "New film coating development for tablet manufacture," Pharmaceutical Manufacturing Review (1997) 1 page.
Kirk-Othmer Encyclopedia of Chemical Technology, Third Edition, Supplement Volume, John Wiley & Sons, New York (1984) p. 560-561.
Kirk-Othmer Encyclopedia of Chemical Technology, John Wiley & Sons, New York (1983) 21:77-105.
Lachman, L. et al., "Factors influencing the properties of films used for tablet coating I. Effects of plasticizers on the water vapor transmission of cellulose acetate phthalate films," J. Pharm. Sci. (1964) 53(6):639-643.
Masters, K., Spray Drying Handbook, Chapter 6, Atomization, 5th Edition (1992) pp. 193-198.
Notice of Opposition Proceedings Against European Patent No. EP1094721 filed Feb. 3, 2005 (10 pages).
Pharmacopee Europeenne, 2nd Edition, "Granulata" (1984) p. 499.
Porter, S.C., "The practical significance of the permeability and mechanical properties of polymer films used for the coating of pharmaceutical solid dosage forms," Int. J. Pharm. Tech & Prod. Mfr. (1982) 3(1):21-25.
Porter, S.C. et al., "Aqueous film coating: an overview. The effect of additives on the properties of an aqueous film coating," Pharm. Tech. (1979 and 1980) 8 pages.
Rowe, R.C. et al., "Some fundamental properties of polymeric materials and their application in film coating formulations—a review," Int. J. Pharm. Tech. & Prod. Mfr. (1982) 3(1):3-8.
Schick, R.J., "An Engineer's Practical Guide to Drop Size," Bulletin No. 459 (1997) 3 pages.
Schoneker, D.R., "Revolutionary on-tablet anti-counterfeiting technologies," AAPS Newsmagazine (2005) 23-24.
Shin-Etsu Chemical Co., Ltd., USP Hydroxypropyl Metylcellulose Pharmacoat, Gastrosoluble Coating Material and Binder, brochure (1990) 18 pages.
Velasco et al., "Influence of drug: hyroxypropylmethylcellulose ration, drug and polymer particle size and compression force on the release of diclofenac sodium from HPMC tablet," J. Contr. Release (1999) 57:75-85.
U.S. Appl. No. 07/630,815, filed Dec. 20, 1990 for Charles A. Signorino, now Abandoned (26 pages).
Watson, Inc., "Edible Glitter," http://www.watson-inc.com/film_edible_glitter.php (2006) 3 pages.
International Search Report and Written Opinion for Application No. PCT/US2007/087611 dated May 14, 2008 (9 pages).
European Patent Office Action for 07869293.6 dated Feb. 22, 2011 (4 pages).
European Patent Office Action for 07869293.6 dated Jul. 17, 2013 (4 pages).
United States Patent Office Action for U.S. Appl. No. 12/443,028 dated Nov. 9, 2011 (18 pages).
United States Patent Office Action for U.S. Appl. No. 11/957,036 dated Mar. 17, 2010 (10 pages).
United States Patent Office Action for U.S. Appl. No. 11/957,036 dated Oct. 6, 2010 (11 pages).
United States Patent Office Action for U.S. Appl. No. 11/957,036 dated Jun. 22, 2011 (25 pages).
United States Patent Office Action for U.S. Appl. No. 11/957,036 dated Jan. 10, 2012 (25 pages).
United States Patent Office Action for U.S. Appl. No. 11/957,036 dated Oct. 10, 2012 (29 pages).
United States Patent Office Final Rejection for U.S. Appl. No. 11/957,036 dated Jun. 27, 2013 (32 pages).
United States Patent Office Action for U.S. Appl. No. 12/443,028 dated May 21, 2012 (20 pages).
United States Patent Office Action for U.S. Appl. No. 11/957,036 dated Jul. 18, 2014 (35 pages).

PEARLESCENT PIGMENT COMPOSITIONS AND METHODS FOR MAKING AND USING THE SAME

CROSS-REFERENCE TO RELATED APPLICATIONS

This application is a continuation of U.S. patent application Ser. No. 11/957,036, filed Dec. 14, 2007, which claims priority to U.S. Provisional Patent Application No. 60/870,046 filed Dec. 14, 2006, the entire contents of each of these applications are incorporated by reference.

FIELD OF USE

This invention relates to pearlescent pigment compositions, and particularly, their use in food and confectionery products. The invention also relates to methods of making pearlescent pigment compositions and methods of applying such compositions to foods and confectionaries.

BACKGROUND

Over the years, considerable effort has been expended to increase the visual appeal of various food and confectionery products. Imparting a pearlescent appearance to products further differentiates new products, even from those having a bright or highly polished finish coat.

SUMMARY

In one aspect, the invention provides a method of imparting pearlescence to a food product. The method includes applying a ready-to-use dispersion to a food product using confectionary panning, where the ready-to-use dispersion includes a pearlescent pigment, a cellulose derivative in an amount sufficient to enhance viscosity of the dispersion and impart a barrier coat to the food product, and a wax in an amount sufficient to impart a gloss to the food product.

In another aspect, the invention provides a ready-to-use dispersion for imparting pearlescence to a food product. The ready-to-use dispersion includes a pearlescent pigment, hydroxypropyl cellulose in an amount sufficient to enhance viscosity of the dispersion and impart a barrier coat to the food product, and a wax that includes at least one of carnauba wax, beeswax, candelilla wax, and combinations thereof, where the wax is present in an amount sufficient to impart a gloss to the food product, and where the dispersion is ready-to-use for application to the food product without the need for any preparation or to add additional components.

In yet another aspect, the invention provides a method of incorporating a pearlescent pigment into a food product. The method includes applying a dispersion to a food product using panning, where the dispersion includes a pearlescent pigment, a viscosity enhancer, a fluid carrier, and a gloss agent.

DETAILED DESCRIPTION

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

In one embodiment, the invention may provide a composition comprising at least one of a pearlescent pigment, a viscosity enhancer, a fluid carrier, a detacking agent, a preservative, and a gloss agent. The compositions are suitably edible and non-toxic. The pearlescent pigments are generally food grade. The compositions may optionally contain additional edible pigments, dyes, and natural colorants. Dispersions comprising the compositions are also provided.

As used herein, the term "pearlescent" generally describes a material that exhibits a spectrum of colors resulting from light refraction instead of pigmentation. In other words, a "pearlescent" material exhibits colors depending on the angles of illumination and viewing. A "pearlescent" material generally appears to have a glossy finish, rather than a matte finish.

As used herein, the term "viscosity enhancer" means a component that modifies the flow characteristics of a composition. Viscosity enhancers may include "substances used to produce viscous solutions or dispersions, to impart body, improve consistency or stabilize emulsions, including suspending and bodying agents, setting agents, jellying agents and bulking agents." See, e.g., 21 CFR 170.3(o)(28). Viscosity enhancers may be used to hold a pigment in suspension.

As used herein, the term "detacking agent" means a component which, when added to a composition that is applied to an end product, at least substantially prevents the end product from sticking to other end products during processing or when placed in closed packaging. Tackiness can result from moisture retention or the lack of proper lubricity.

As used herein, the term "gloss agent" means an agent which, when added to a composition that is added to an end product, provides a mirror finish to a surface of the end product in certain applications. This shiny appearance is beneficial both for aesthetic reasons and to allow the product to "slip" through the processing lines for transport to packaging. Gloss agents may, but need not, also provide long-term product shelf stability by protecting the product from moisture or oxygen transfer/migration. This is particularly useful in confectionery applications such as soft and hard panning.

The use of a pearlescent pigment confers the ability to impart improved pearlescence to edible articles. The pearlescent pigment should be capable of meeting all government approved requirements for human consumption. Suitably, these pearlescent pigments include those pigments having a mica, titanium oxide or iron oxide base. In one embodiment, the pearlescent pigment comprises a micaceous pearlescent pigment, such as those containing mica coated with titanium dioxide, iron oxide, and combinations thereof. Other examples of pearlescent pigments include, but are not limited to, those available under the trade name Candurin® from Merck KGaA and those set forth in PCT publication No. WO 00/03609, the entire disclosure of which is incorporated herein by reference. A non-limiting list of suitable Candurin® pearlescent pigment products include the following: silver fine, silver sheen, silver lustre, silver sparkle, gold shimmer, red shimmer, blue shimmer, green shimmer, gold sheen, light gold, gold lustre, brown amber, orange amber, red amber, red lustre, and red sparkle. Other examples of pearlescent pigments include, but are not limited to, those available under the trade names BiLite®, Cellini®, ChromaLite®, Cloisonne®, Cosmica®, Desert Reflections®, Duocrome®, Flamenco®, Gemtone®, Mearlite®, Mearlmaid®, Pearl-Glo®, Reflecks®, Shinju®, and Timica® from the BASF Group (formerly Engelhard Corporation) and those set forth in U.S. Pat. No. 6,627,212 and U.S. Patent Publication No. 2005-0257716, each of which is hereby fully incorporated by reference. Other pearlescent pigments are based on platy titanium dioxide which imparts a distinctive color. Additional pearlescent pigments that may be utilized are available from HebeiOxen (China). Examples of pearlescent pigments from HebeiOxen include, but are not limited to, pigments from the anatase series, including bright silver, fine silver, satin silver, metal silver, intense silver, and super bright silver; pigments from the gold luster series, including, bright brass gold, satin super gold, fine gold, bright orange, flash gold, bright violet gold, bright rose red, satin khaki, and bright khaki; pigments from the rutile series, including, bright silver, fine silver, satin silver, satin gold, bright gold, satin red, bright red, bright red orange, bright violet, satin violet, satin blue, bright blue, satin green, bright green, satin violet, bright violet; pigments from the metal luster series, including, bright brown yellow, bright red, bright violet red, satin violet red, bright violet, satin violet, satin red, bright green, bright brown, metal brown yellow, bright orange red, and satin orange red; pigments from the dyeing series, including satin gray, bright blue, bright yellow, bright green, bright peachblow, and bright violet red; pigments from the polychrome series, including bright super blue, bright blue, bright blue violet, bright blue green, bright green blue, bright green, and bright green yellow; pigments from the weather resistance series, including bright silver, satin silver, bright red, bright violet red, bright blue, and bright green; pigments from the super-strength weatherable series, including blue green, bright green, bright violet, bright blue violet red, and yellow green; pigments from the 9000 series, including bright black and satin black; pigments from the silver white series, including crystal silver, and crystal sparkling silver; pigments from the interference series, including sparkling gold, glowing red, amethyst violet, ultra sparkling blue, and ultra sparkling green; pigments from the gold series, including brass gold; pigments from the iron series, including brown yellow and violet red. Other examples of pearlescent pigments include, but are not limited to, those available under the trade name Covapearl® from Sensient. A non-limiting list of suitable Covapearl® pearlescent pigment products include the following: green 737, light dore 235, antique 236, bright 933, spark silver 937, satin 931, silver 939, red 339, pink 433, and blue 635. Other examples of pearlescent pigments may be found in U.S. Pat. Nos. 5,611,851 and 6,902,609 and U.S. Patent Publication No. 2005-0147724, each of which is hereby fully incorporated by reference. Other pearlescent pigments are based on iron oxide based pigments available from HebeiOxen.

Viscosity modifiers include any functioning component affirmed as GRAS (Generally Recognized As Safe) in the CFR (Code of Federal Regulations) Title 21, Part 184. Examples of viscosity enhancers include, but are not limited to, polymers, stabilizers, surfactants, gums, starches, sealants, shellacs and waxes. Specific examples of viscosity modifiers include, but are not limited to, alginic acid compounds, carboxymethyl cellulose, carrageenan, corn zein, dextrins, gelatins, gellan gum, guar gum, gums, gum ghatti, hydroxyethyl cellulose, hydroxypropyl methyl cellulose ("HPMC"), hydroxypropyl cellulose ("HPC"), karaya gum, Konjac flour, locust bean gum, methyl cellulose, pectins, polyvinyl pyrrolidone, protein isolates, rosin compounds, polyvinyl alcohol, salts of polyacrylic acid, sodium alginate, sodium carboxymethylcellulose, sorbitols, starch, vinyl acetate/vinyl pyrrolidone copolymers and natural gums such as gum tragacanth, gum acacia, gum Arabic, and xanthan gums, maltodextrin, polydextrose, whey protein, zeins, and mixtures thereof. Mixtures of polymers may also be used.

Fluid carriers include, but are not limited to alcohols, solvents, oils and water. Examples of specific fluid carriers include, but are not limited to, 1,3-butylene glycol, 1,1,2-trichlorotrifluoroethane, 2-nitropropane, acetone, acetylated monoglycerides, amyl acetate, benzyl alcohol, butan-1-ol, butan-2-ol, castor oil, coconut oil, cottonseed oil, dichloromethane, diethyl ether, diethyl tartrate, diethylene glycol monoethyl ether, food grade oils, glucose syrup, ethyl acetate, ethyl alcohol, ethyl methyl ketone, ethylene dichloride, furfural, glycerin, glycerol, glycerol diacetate, heptane, hexabe, isobutanol, isopropyl acetate, isopropyl alcohol, isopropyl myristate, maltitol, mannitol, medium chain triglycerides, methanol, methyl alcohol, methylene chloride, palm kernel oil, poloxamer 331, poloxamer 407, polyols, propan-1-ol, propan-2-ol, propylene glycol, SDA alcohol, sorbitols, soybean oil, sucrose syrup, syrups, toluene, triacetin, trichloroethylene, triethyl citrate, glucose syrup, corn syrup solids, xylitol, and combinations thereof.

Detacking agents may include, but are not limited to, aluminum hydrate, acetylated glycerides, diglycerides, acetylated monoglyceride, polyvinylpyrrolidone, sorbitan monostearate, polyglycerol esters, ethyl acetate, glyceryl monostearate, lecithins, monoglycerides, poloxamers, polysorbates, stearic acid, sodium lauryl sulfate, talc, triacetin, triethyl citrate, and combinations thereof.

Gloss agents may include, but are not limited to, acetylated monoglycerides, beeswax (white), beeswax (yellow), candelilla wax, castor oil, carnauba wax, dextrin ethyl cellulose, hydroxypropyl cellulose, methylcellulose, mineral oil (white), petrolatum, petroleum wax, petroleum wax (synthetic), rice bran wax, shellac (bleached), shellac (bleached, wax free), talc, polydextrose, maltodextrin, glucose syrup, corn syrup solids, and combinations thereof.

The composition of the present invention may further comprise stabilizers or thickeners. Examples of these components include, but are not limited to acacia, acetylated distarch adipate, acetylated distarch phosphate, acid treated starch binder, agar, alginic acid, alkaline treated starch, ammonium alginate, bleached starch, brominated vegetable oil, carob bean gum, carrageenan, cellulose (powdered), dammar gum, dextrin, dextrins (roaster starch), disodium EDTA, disodium hydrogen phosphate, disodium pyrophosphate, distarch phosphate, edible gelatin, ethyl hydroxyethyl cellulose, food starch, gellan gum, glycerol ester of wood rosin, guar gum, gum Arabic, gum ghatti, hydroxypropyl cellulose, hydroxypropyl distarch phosphate, hydroxypropyl methyl cellulose, hydroxypropyl starch, insoluble polyvinylpyrrolidone, karaya gum, lactated mono-diglycerides, lactitol sweetening agent, lactylated fatty acid esters of glycerol and propylene glycol, locust (carob) bean gum, mannitol dietary supplement, methyl cellulose, methyl ethyl cellulose, modified starches, mono- and diglycerides, monostarch phosphate, oxidized starch, pectin, phosphated distarch phosphate, poloxamer 331, poloxamer 407, polydextroses, polysorbate 20, polysorbate 60, polysorbate 65, polysorbate 80, polyvinylpyrrolidone, potassium alginate, polyphosphates, potassium pyrophosphate, potassium sodium L(+)-tartrate, processed eucheuma seaweed, propylene glycol alginate, propylene glycol mono- and diesters, PVP, sodium stearyl lactylate, sodium alginate, sodium carboxymethylcellulose, sodium caseinate, sodium L(+)-tartrate, sodium metaphosphate, sodium phosphate, sodium polyphosphates, sorbitan monostearate, starch acetate, starch sodium oxtenylsuccinate, stearyl monoglyceridyl, tara gum, tragacanth gum, tripotassium citrate, trisodium citrate, trisodium phosphate, xantham gum, polyols, sodium citrate and combinations thereof.

The composition of the present invention may further comprise preservatives. Examples of preservatives include, without limitation, benzoates, sodium benzoate, parabens, methyl paraben, propyl paraben, sorbates, potassium sorbate, and combinations thereof.

In another embodiment, the dispersions do not require the use of shellac coatings, dextrins, or HPMC to impart pearlescence to a food product.

HPC may work better in some applications than HPMC. Specifically, HPC may improve the strength of a barrier created by the dispersion and/or increase the viscosity of the dispersion. HPC is also optimally soluble in the dispersion. HPC has better barrier properties, builds more viscosity, and is more soluble than HPMC. In some applications, these qualities may be more desirable.

Barrier is important because it protects the food product so that outside components cannot penetrate the food and components cannot leave the food. For instance, the barrier provides moisture and oxygen protection in some instances. HPC possesses barrier qualities that make it possible to apply the dispersion to the food product in a single step. The barrier helps prepare the surface of the food to receive the pigment. Instead of having to subcoat the food product before application of the pigment, the dispersion of the present invention provides a multifunctional component that is able to apply a pigment and a barrier coat, enhance viscosity, and apply a gloss agent, all in a single step.

Greater viscosity may also be desirable as it helps maintain the pigment in the dispersion. Too much viscosity is not desirable though, because the suspension must remain flowable.

The compositions and dispersions of the present application may be prepared using different methods. All methods are conducted under ambient temperature and pressure unless specified otherwise.

In one embodiment, at least one fluid carrier is added to a mixing vessel. At least one of preservatives and viscosity enhancers are mixed with the at least one fluid carrier, in some instances, until homogenous. At least one pearlescent pigment is then added under low shear mixing, in some instances, until homogenous. Examples of equipment for shear mixing that may be used in all methods include, but are not limited to, Cowles mixers, Myers mixers, Silverson mixers, and Lightnin® mixers. The low shear mixing may be conducted from about 25 to about 1000 RPMs, and suitably from about 25 to about 300 RPMs.

In another embodiment, a pre-mix (1) of at least one fluid carrier (e.g. water) is heated to about 170 to about 212 degrees F., and suitably to about 180 to about 200 degrees F. The pre-mix (1) is agitated as at least one viscosity modifier (e.g., gum) is slowly added. This is mixed until solubilized, and then cooled to about 60 to about 90 degrees F., and suitably to about 65 to about 75 degrees F. In a separate vessel, a second pre-mix (2) of at least one fluid carrier (e.g., an alcohol ethyl acetate mixture) and at least one viscosity modifier (e.g., gum) is prepared. This is mixed until the viscosity modifier is solubilized and, in some instances, until the solution is homogenous. Pre-mixes (1) and (2) are then mixed, in some instances, until homogenous. Under shear, conducted from about 25 to about 3000 RPMs, and suitably from about 300 to about 1500 RPMs, at least one gloss agent (e.g., a wax) is added and, in some instances, homogenously mixed. Finally, under low agitation, so as not fracture the pigment particles, at least one pearlescent pigment is added.

In a further embodiment, at least one fluid carrier is added to at least one viscosity modifier and, optionally, at least one preservative. These components are mixed until homogenous. Under low shear agitation, at least one pearlescent pigment is added to these components and mixed, in some cases, until uniform.

In yet another embodiment, at least one fluid carrier is added to a vessel. Water is then mixed with the at least one fluid carrier, in some instances, until homogenous. At least one viscosity modifier (e.g., gum) is then added and mixed with low agitation until solubilized, and in some instances, uniform. At least one stabilizer, at least one detacking agent, and at least one gloss agent are then added and mixed, in some instances, until uniform under high-speed agitation. At least one preservative may be added as needed. At least one pearlescent pigment may be added under low agitation until uniformly mixed, using caution not to overmix.

The dispersion may include (by weight) from about 5% to about 50% pearlescent pigment, particularly from about 1% to about 30%, particularly from about 10% to about 30%, and more particularly from about 15% to about 20%. It will be understood, however, that the amount of pearlescent pigment employed in the dispersions of the invention is dependent on the opacity of the specific pigment being utilized and whether the other pigments are being added to the mixture. The amount is based on what is sufficient or effective to impart an improved pearlescent appearance to the product.

The amount of fluid carrier (by weight) in the dispersion may be from about 50% to about 95%, particularly from about 70% to about 90%, and more particularly from about 75% to about 85%.

The amount of detacking agent (by weight) in the dispersion may be from about 0.5% to about 20%, particularly from about 1% to about 10%, and more particularly from about 2% to about 5%.

The amount of gloss agent (by weight) in the dispersion may be from about 0.5% to about 40%, particularly from about 1% to about 30%, and more particularly from about 2% to about 15%.

The amount of stabilizer or thickener (by weight) in the dispersion may be from about 0.5% to about 40%, particularly from about 1% to about 30%, and more particularly from about 2% to about 15%.

The amount of viscosity enhancer (by weight) in the dispersion may be from about 0.5% to about 40%, particularly from about 1% to about 30%, and more particularly from about 2% to about 15%.

In some embodiments, the amount of HPC (by weight) in the dispersion may be from about 0.5% to about 40%, particularly from about 1% to about 30%, particularly from about 2% to about 15%, and more particularly from about 6% to about 14%.

In some embodiments, the amount of wax (by weight) in the dispersion may be from about 0.5% to about 40%, particularly from about 1% to about 30%, particularly from about 2% to about 15%, and more particularly from about 0.5% to about 7%.

Products suitable for coloring with the composition of the present invention include all types of foods, including, but not limited to, pigmented sugar coatings and shellac coatings (alcoholic and aqueous), coatings containing oils and waxes, gum Arabic and cellulose types (e.g. HPMC—hydroxypropyl methyl cellulose). The composition may be incorporated into or applied onto, without limitation, confectionery, confectionery items, cake decorations, compressed tablets, compressed products, pan-coated products, chewing gums, gum products, dragees, fondant products, marzipan products, filling compositions, cocoa icings and fat icings, chocolate and chocolate-containing products, cocoa gum, tempered chocolates, ice cream, cereals, snack products, coating compositions, glazes, cake glazes, cake bases, produce, scattered sugar decorations, nonpareils, gateaux presentation plates, sugar crystals, dextrose crystals, jelly, gel and gelatin products, sweets, candy, licorice, frostings and icings, candyfloss, fat, sugar and baker's cream compositions, blancmange, puddings, desserts, flan glazing, pretzels, cookies of all types and other based goods such as ice cream cones, crackers, biscuits, enrobed cookies, jelly beans, soft panned items, gumballs, Jordan almonds, various panned confectionery items, chocolate panned nuts, white confectionery coating/yogurt coated products like raisins, caramel pieces, malt balls, smooth hard candies including deposited types (including lozenges), gummy bears or other shapes, molded and enrobed chocolates, cold sweet soups, sodas and carbonated drinks, beverages, alcoholic beverages, non-alcoholic beverages, beverages containing stabilizing additives (such as carboxy methyl cellulose, acidified and non-acidified milk products such as quark, yogurt, cheese, cheese rings, sausage casings, etc.), dairy products, taffy, marshmallows, baked goods, baking mixes, breakfast cereals (including ready-to-eat, instant, and hot), dairy product analogs, nondairy milk, nondairy creamers, nondairy toppings, dressings for salads, food grade inks, decorations, sprinkles, fruit and water ices, frozen confections, gelatin desserts and products, pie fillings, chips, novelty snacks, and combinations thereof.

Application of the pearlescent pigment in a dry form creates nuisances such as dust. In fact, current material safety data sheets (MSDS) recommend the use of respiratory protection when working with pearlescent pigments in the dry form. The dispersions of the present invention may eliminate these human safety concerns. In certain applications, the use of dispersions can eliminate processing steps that will improve production efficiencies and product quality or consistency. To elaborate, a normal sugar panning process entails the application of 12-20 coats (average) of color applications to develop the proper finished shade and the traditional texture of a sugar shell. Once the color is applied, the following separate steps are needed to finish the panned goods:

Applying a component to protect the product from humidity, temperature fluctuations, and oxygen (i.e. a sealant/barrier step in which a component is applied);
Applying one to two dry charges of the pearlescent pigment to impart a shimmery effect; and
Applying a polishing or shine agent to buff the product to a glossy shine.

By using the methods and dispersions of the present invention, these finishing steps can be accomplished with one or two applications. Further, because the pigment is in a pre-dispersed form, the need for separate respiratory protection may no longer be necessary.

Furthermore, previous methods have focused on the application of the pearlescent pigment through formulations and equipment tailored to film coating and the pharmaceutical industries. This is a specialized technology that requires significant capital investment for atomizing equipment to deliver the pearlescent pigment onto the food product. This type of delivery system also yields a very unique mouth-feel to the end product, which may not be desirable in food applications, particularly, confectionery applications. The methods and dispersions of the present invention do not require the additional capital investment or specialized pans. Traditional rotational pans are acceptable for applying the present dispersion systems. In addition, the one-step, one-pan application offers an economical advantage by reducing production cycle times which could increase output.

In one embodiment, confectionery panning may be used to apply the dispersion to a food product. Examples of confectionery panning include, without limitation, hard shell panning and soft shell panning.

Hard shell panning involves multiple coatings of super saturated sucrose solutions tumbled onto a product charge in a rotational pan. Each application is distributed (wetted) over the surface of all the candy pieces in the pan and then dried. This process is repeated multiple times (10-24 applications is typical). With each application the shell becomes thicker and harder. This is the result of the drying or crystallization of the sugar used in the coating solution. The final effect is a crunchy, sweet sugar shell.

Soft shell panning involves an application of an adhesive solution (typically, but not always, an invert sugar solution) to a center as it is tumbled in a revolving pan. The centers are then coated with sugar (dry charged into the pan). Repeated applications of this process builds up a uniform coating around the product being panned. The typical "adhesive" that is used traps moisture into this matrix (or coating) and yields a more tender mouth-feel than hard shell panning. This is the type of panning that is used to create foods such as jelly beans.

In one non-limiting embodiment of the invention, a dispersion method is a one-step system that provides a pearlescent effect and a glossy shine as a finishing coat for panned products. First, the panned product may be dry (in some instances, completely) and wax-free prior to adding the dispersion. The dispersion, in an amount that is about 0.2% to about 10% (by weight), suitably about 0.4% to about 1.2% (by weight), and more suitably about 0.7% to about 0.8% (by weight) of the product being held in a tumbling pan, is applied to the product. The dispersion can be directly or indirectly applied to a tumbling mass of product by being sprayed, atomized, or ladled, or by any means that are convenient and conducive to the pan configuration. The tumbling of the product is continued without air being applied to the product for about 0.5 minutes to about 10 minutes, and suitably about 3 minutes to about 8 minutes. Once the product is dry to the touch and begins to shine, cool air (from about 50 degrees F. to about 100 degrees F., and suitably about 60 degrees F. to about 80 degrees F.) is applied to the product while it is tumbled for about 5 minutes to about 40 minutes, and suitably about 20 minutes to about 30 minutes. If desired, a second coat can be applied by repeating the same process. A second application may intensify the pearlescent effect. Before each use, the dispersion may be shaken or stirred.

The dispersions of the present invention are generally ready-to-use. They do not require any preparation before application to a food product. Nor do they require the addition of any components before application to a food product. As a result, a customer in the food industry can receive a dispersion, and apply the dispersion to its food products with little or no preparation work.

The dispersion systems may be at least one of flowable, stable, and liquid, and deliver the pearlescent pigment into a variety of food/confectionery applications. In certain specific applications, such as confectionery panning, components have been added to the systems to allow quick drying. This also prevents the pigment from rubbing off as it is transported to the packaging areas.

The dispersion systems may have excellent flowability, or viscosity properties. Using a Brookfield viscometer or rotational viscometer at ambient temperature and pressure, the dispersion systems may have a viscosity from about 250 to about 15,000 centipoises, suitably from about 250 to about 10,000 centipoises, suitably from about 500 to about 5,000 centipoises, and suitably from about 1,500 to about 4,000 centipoises.

The dispersion systems may also have excellent quick drying properties. At ambient temperature and pressure, the dispersion system may dry in less than about 4 minutes, suitably less than about 1 minute, and more suitably less than about 15 seconds. In another embodiment, at ambient temperature and pressure, the dispersion system may dry in less than about 10 minutes, suitably less than about 7 minutes, and suitably in less than about 6 minutes.

In addition, the dispersion systems may possess stable shelf-life properties. At ambient temperature and pressure, the dispersion system may remain shelf stable for at least about 6 months, suitably at least about 1 year, and suitably at least about 2 years.

The dispersion systems may also possess excellent tackiness and spreadability properties. Tackiness prevents components from adhering to one another and from sticking to the pan. Spreadability allows the dispersion system to spread evenly. The dispersion system spreads the pearlescent pigment evenly.

EXAMPLES

The following examples were or are made using the following method, unless otherwise specified. The first two listed components were or are added and mixed until homogenous. Each additional component was or is added, one at a time, in the order listed, and mixed until homogenous. Example 1 describes this in more detail. To avoid redundancy, the remaining examples do not, although they were or are formed in the same manner.

Example 1

Pearlescent Pigment Dispersion

The following dispersion comprised a food grade component acting as a carrier for pearlescent pigment. It was manufactured in production scale mixers.

| Component | Supplier | Amount in grams |
|---|---|---|
| SDA 3A Alcohol | Transchemical | 65.60 |
| Ethyl Acetate | G. S. Robins | 2.85 |
| Hydroxypropyl cellulose | Harcros | 8.55 |
| Carnauba wax | Frank B. Ross | 6.00 |
| Pearlescent pigment (Covapearl ® spark silver 937) | Sensient Technologies | 17.00 |

The above formulation was designed specifically for confectionery applications onto panned products. It is a single system that incorporates a barrier coat, a shimmery, pearlized effect, and a finished polished shine. As discussed above, first the SDA alcohol and ethyl acetate were mixed until homogenous. The HPC was then added to the mixture and mixed until homogenous. The Carnauba wax was then added and mixed until homogenous. Finally, the pigment was added and mixed until homogenous.

Example 2

Hard Candy Application

| | |
|---|---|
| Glycerine | 80.00 g |
| Pearlescent pigment (satin red supplied by HebeiOxen) | 20.00 g |

Example 3

Hard Candy Application

| | |
|---|---|
| Glycerine | 75.00 g |
| PVP | 02.00 g |
| Pearlescent pigment (satin red supplied by HebeiOxen) | 23.00 g |

Example 4

| | |
|---|---|
| SDA 3A Alcohol | 61.60 g |
| Ethyl Acetate | 03.85 g |
| Hydroxypropyl cellulose | 11.55 g |
| Carnauba Wax | 06.00 g |
| Pearlescent pigment (Covapearl ® spark silver 937) | 17.00 g |

Example 5

| | |
|---|---|
| SDA 3A Alcohol | 60.53 g |
| Ethyl Acetate | 04.12 g |
| Hydroxypropyl cellulose | 12.35 g |
| Carnauba Wax | 06.00 g |
| Pearlescent pigment (Covapearl ® spark silver 937) | 17.00 g |

Example 6

| | |
|---|---|
| SDA 3A Alcohol | 50.529 g |
| Water | 10.00 g |
| Hydroxypropyl cellulose | 12.35 g |
| Gellan Gum | 00.001 g |
| Ethyl Acetate | 04.12 g |
| Carnauba Wax | 06.00 g |
| Pearlescent pigment (Covapearl ® spark silver 937) | 17.00 g |

Example 7

| | |
|---|---|
| SDA 3A Alcohol | 63.53 g |
| Ethyl Acetate | 04.12 g |
| Hydroxypropyl cellulose | 12.35 g |
| Carnauba Wax | 03.00 g |
| Pearlescent pigment (Covapearl ® spark silver 937) | 17.00 g |

Example 8

| | |
|---|---|
| SDA 3A Alcohol | 73.10 g |
| Ethyl Acetate | 03.85 g |
| Hydroxypropyl cellulose | 11.55 g |
| Carnauba Wax | 03.00 g |
| Pearlescent pigment (Covapearl ® spark silver 937) | 08.50 g |

Example 9

| | |
|---|---|
| SDA 3A Alcohol | 55.529 g |
| Water | 05.00 g |
| Hydroxypropyl cellulose | 12.35 g |
| Gellan Gum | 00.001 g |
| Ethyl Acetate | 04.12 g |
| Carnauba Wax | 06.00 g |
| Pearlescent pigment (Covapearl ® spark silver 937) | 17.00 g |

Example 10

| | |
|---|---|
| Water | 86.20 g |
| Xanthan Gum | 00.80 g |
| PVP | 01.00 g |
| Pearlescent Pigment (Covapearl ® spark silver 937) | 12.00 g |

Example 11

| | |
|---|---|
| Water | 89.20 g |
| Xanthan Gum | 00.80 g |
| Pearlescent Pigment (Covapearl ® spark silver 937) | 10.00 g |

Example 12

| | |
|---|---|
| Water | 95.60 g |
| Maltodextrin | 02.00 g |
| Lecithin | 00.40 g |
| Pearlescent Pigment (Covapearl ® spark silver 937) | 02.00 g |

Example 13

| | |
|---|---|
| Water | 95.20 g |
| Maltodextrin | 02.00 g |
| Lecithin | 00.16 g |
| Carnauba Wax | 00.64 g |
| Pearlescent Pigment (Covapearl ® spark silver 937) | 02.00 g |

Example 14

| | |
|---|---|
| Pharmaceutical Glaze | 80.00 g |
| Pearlescent Pigment (Covapearl ® spark silver 937) | 20.00 g |

Example 15

| | |
|---|---|
| Pharmaceutical Glaze | 40.00 g |
| SDA 3A Alcohol | 40.00 g |
| Pearlescent Pigment (Covapearl ® spark silver 937) | 20.00 g |

Example 16

| | |
|---|---|
| Water | 50.60 g |
| Methyl Paraben | 0.20 g |
| Propyl Paraben | 0.01 g |
| Lecithin | 0.39 g |
| SDA 3A Alcohol | 3.00 g |
| Sodium Benzoate Solution | 1.80 g |
| Carboxymethylcellulose (CMC) | 0.20 g |
| Mineral Oil | 0.30 g |
| Gum Arabic | 18.50 g |
| Pearlescent pigment (Covapearl ® spark silver 937) | 25.0 g |

Example 17

| | |
|---|---|
| Water | 5.00 g |
| Ethyl Acetate | 4.00 g |
| Hydroxypropyl cellulose (Klucel ®, available from Hercules, Inc.) | 11.60 g |
| Gellan Gum | 0.005 g |
| SDA 3A Alcohol | 65.395 g |
| Pearlescent pigment (Covapearl ® spark silver 937) | 14.00 g |

Example 18

Hard Candy Application

General Procedure for Hard Candy Manufacture
Equipment Needed:
1. 18" by 24" marble slab
2. Candy press (optional)
3. 2-4" metal scrapers
4. 1—one (1) quart sauce pan
5. 1—two (2) quart sauce pan
6. 150° C. (or 300° F.) thermometer Materials Needed:
1. Granular sugar RM #71808 (or granulated table sugar)
2. Light corn syrup 60 DE (Karo light corn syrup)
3. Corn oil RM #70218 (Wesson or equivalent)
4. Color
5. Flavor (optional)
6. Citric acid powder RM #70212 (optional)

Procedure:
Formula:

| Granulated sugar | 71808 | 66.0 wt % | 330.0 g |
| Corn syrup | — | 17 wt % | 85.0 g |
| Water | 70000 | 17 wt % | 85.0 g |

1. The above ingredients were weighed into the one (1) quart saucepan. Any batch size worked, but a 500 gram batch was used.
2. The metal scrapers were oiled, as well as the marble slab and any other surfaces that came in contact with the candy mixture. The two (2) quart saucepan was kept filled with water and at medium heat. When the thermometer was not in use, it helped prevent the candy from hardening on the thermometer.
3. The candy mixture was boiled at high heat while stirring occasionally. The temperature was monitored.
4. When a temperature of 147° C. was reached, the candy was ready for processing. The contents were poured onto the oiled marble slab. Hot water was run into the pan immediately after so that the remaining candy mixture did not get a chance to harden in the pan.
5. Color, citric acid (70212) and/or flavor was added as desired.
6. The ingredients were folded into the candy mixture with the oiled scrapers.
7. As the candy was worked around the slab, it cooled down. When the candy cooled and held its shape, it was ready for the press (optional). It was usually best to run the candy through the press in two sections.

To this standard 500 gram hard candy recipe, a 1 gram aliquot of the pearlescent pigment dispersion from Example 2 was added to the hot finished candy and mixed until homogenous. The hard candy mixture was then poured into candy molds.

Example 19

Hard Candy Application

To the standard 500 gram hard candy recipe listed in Example 16, a 1 gram aliquot of the pearlescent pigment dispersion from Example 3 was added to the hot finished candy and mixed until homogenous. The hard candy mixture was then poured into candy molds.

Example 20

Panned Product Application 500 grams of titanium dioxide subcoated placebos were panned with 12 coats of food grade lake color (about 2.5 mL of colored coating syrup comprising about 2% FD&C Blue #2 Lake in about 67% sugar syrup solution). The product was tumbled without air for 1 minute, and then tumbled with air for 3-5 minutes. Then, using a rotating traditional pan at 25 RPMs and a hot air gun, the titanium subcoat was panned with 4 mL of the pearlescent pigment dispersion of Example 4. The titanium subcoat was completely dry prior to adding the dispersion. The dispersion, in an amount that was about 0.8% (by weight) of the product, was applied to the 500 gram batch being held in the rotating pan. The dispersion was applied directly to the tumbling product in the rotating pan by pouring from a laboratory beaker. The tumbling of the product was continued without air being applied to the product for 30 seconds. Once the product was dry to the touch and began to shine, cool air at about 75 to about 80 degrees F. was applied, using a hot air gun, to the mass while it was tumbled for 30 minutes.

Example 21

Panned Product Application

Using the dispersion of Example 6 and the procedure of Example 18, titanium dioxide subcoated placebos were panned with the pearlescent pigment dispersion.

Example 22

Panned Product Application

Using the dispersion of Example 8 and the procedure of Example 18, titanium dioxide subcoated placebos were panned with the pearlescent pigment dispersion.

Example 23

Panned Product Application

Using the dispersion of Example 9 and the procedure of Example 18, titanium dioxide subcoated placebos were panned with the pearlescent pigment dispersion.

Example 24

Panned Product Application

Using the dispersion of Example 4 and the procedure of Example 18, jelly beans (instead of the placebos) were panned with the pearlescent pigment dispersion.

Example 25

Panned Product Application

Using the dispersion of Example 4 and the procedure of Example 18, yogurt coated gummies (instead of the placebos) were coated with the pearlescent pigment dispersion.

Example 26

Panned Product Application

Using the dispersion of Example 4 and the procedure of Example 18, sugar shell coated chocolate pieces (instead of the placebos) were panned with the pearlescent pigment dispersion.

Example 27

Panned Product Application

Using the dispersion of Example 4 and the procedure of Example 18, malted milk balls (instead of the placebos) were panned with the pearlescent pigment dispersion.

Example 28

Panned Product Application

Using the dispersion of Example 10 and the procedure of Example 18, titanium dioxide subcoated placebos were panned with the pearlescent pigment dispersion.

Example 29

Panned Product Application

Using the dispersion of Example 11 and the procedure of Example 18, titanium dioxide subcoated placebos were panned with the pearlescent pigment dispersion.

Example 30

Panned Product Application

Using the dispersion of Example 12 and the procedure of Example 18, titanium dioxide subcoated placebos were panned with the pearlescent pigment dispersion.

Example 31

Panned Product Application

Using the dispersion of Example 13 and the procedure of Example 18, titanium dioxide subcoated placebos were panned with the pearlescent pigment dispersion.

Example 32

Panned Product Application

Using the dispersion of Example 14 and the procedure of Example 18, titanium dioxide subcoated placebos were panned with the pearlescent pigment dispersion.

Example 33

Panned Product Application

Using the dispersion of Example 15 and the procedure of Example 18, titanium dioxide subcoated placebos were panned with the pearlescent pigment dispersion.

Prophetic Examples

Example 34

For Clear Gels:

| | |
|---|---|
| Propylene glycol | 80.00 g |
| Xanthan gum | 02.00 g |
| Pearlescent pigment | 18.00 g |

Example 35

Fat-Based Applications

| | |
|---|---|
| Partially hydrogenated cottonseed and soybean oils | 80.00 g |
| Pearlescent pigment | 20.00 g |

Example 36

Fat-Based Applications

| | |
|---|---|
| Medium Chain Triglycerides | 75.00 g |
| Pearlescent pigment | 25.00 g |

Example 37

Coating Applications

| | |
|---|---|
| SDA 3A Alcohol | 63.00 g |
| Distilled Acetylated Monoglycerides | 02.00 g |
| Hydroxypropyl cellulose | 10.00 g |
| PVP | 02.00 g |
| Carnauba Wax | 04.00 g |
| Beeswax | 02.00 g |
| Pearlescent pigment | 17.00 g |

Example 38

| | |
|---|---|
| Isopropyl alcohol | 81.80 g |
| Hydroxypropyl cellulose | 08.20 g |
| Pearlescent pigment | 10.00 g |

Example 39

| | |
|---|---|
| Isopropyl alcohol | 4.10 g |
| Water | 20.00 g |
| Hydroxypropyl cellulose | 06.90 g |
| Gellan Gum | 02.00 g |
| PVP | 10.00 g |
| Propylene Glycol | 05.00 g |
| Pearlescent pigment | 15.00 g |

What is claimed is:

1. A method of imparting pearlescence to a food product, the method comprising:
applying a dispersion to a food product using confectionary panning without applying a subcoat to the food product, wherein the dispersion comprises food grade alcohol in an amount from about 50% to about 95% by weight of the dispersion, a pearlescent pigment, hydroxypropyl cellulose in an amount from about 6% to about 14% by weight of the dispersion, carnauba wax in an amount from about 2% to about 7% by weight of the dispersion, water from about 0% to about 10% by weight of the dispersion, ethyl acetate from about 2% to about 5% by weight of the dispersion, and a gum from about 0% to about 0.01% by weight of the dispersion.

2. The method of claim 1, wherein the pearlescent pigment is present in an amount from about 1% to about 30% by weight of the dispersion.

3. The method of claim 1, wherein the pearlescent pigment comprises a micaceous pearlescent pigment coated with titanium dioxide, iron oxide, and combinations thereof.

4. The method of claim 1, wherein the dispersion comprises food grade alcohol in an amount from about 60% to about 90% by weight of the dispersion.

5. The method of claim 1, wherein the confectionery panning requires only a single step.

6. The method of claim 1, wherein the confectionary panning comprises hard shell panning.

7. The method of claim 1, wherein the confectionary panning comprises soft shell panning.

8. The method of claim 1, wherein the dispersion has a viscosity from about 250 centipoises to about 10,000 centipoises.

9. The method of claim 1, wherein the dispersion dries in less than about 7 minutes.

10. The method of claim 1, wherein the dispersion remains shelf stable for at least about 6 months.

11. A dispersion for imparting pearlescence to a food product comprising:
a food grade alcohol in an amount from about 50% to about 95% by weight of the dispersion,
a pearlescent pigment,
hydroxypropyl cellulose in an amount from about 6% to about 14% by weight of the dispersion,
carnauba wax in an amount from about 2% to about 7% by weight of the dispersion,
water from about 0% to about 10% by weight of the dispersion,
ethyl acetate from about 2% to about 5% by weight of the dispersion, and
a gum from about 0% to about 0.01% by weight of the dispersion,
wherein the dispersion does not contain a dextrin,
wherein the dispersion is ready-to-use for application to the food product in that no further preparation is needed prior to the dispersion being applied to the food product, no additional components need be added to the dispersion prior to the dispersion being applied to the food product, and no subcoat need be applied to the food product.

12. A method of incorporating a pearlescent pigment into a food product, the method comprising:
applying a dispersion to a food product using panning without applying a subcoat to the food product, wherein the dispersion comprises a food grade alcohol in an amount from about 50% to about 95% by weight of the dispersion, a pearlescent pigment, hydroxypropyl cellulose in an amount from about 6% to about 14% by weight of the dispersion, carnauba wax in an amount from about 2% to about 7% by weight of the dispersion, water from about 0% to about 10% by weight of the dispersion, ethyl acetate from about 2% to about 5% by weight of the dispersion, and a gum from about 0% to about 0.01% by weight of the dispersion.

13. The method of claim 12, wherein the dispersion does not contain a shellac.

14. The method of claim 12, wherein the method comprises applying the dispersion to a food product using confectionary panning.

15. The method of claim 12, wherein the dispersion further comprises a preservative.

16. The method of claim 12, wherein the dispersion further comprises stabilizers, thickeners, or combinations thereof.

17. The method of claim 15, wherein the preservative comprises at least one of benzoates, parabens, sorbates, and combinations thereof.

18. A method of imparting pearlescence to a food product, the method comprising:
applying a dispersion to a food product using confectionary panning without applying a subcoat to the food product, wherein the dispersion comprises a food grade alcohol in an amount from about 60% to about 90% by weight of the dispersion, a pearlescent pigment in an amount from about 1% to about 30% by weight of the dispersion, hydroxypropyl cellulose in an amount from about 6% to about 14% by weight of the dispersion, carnauba wax in an amount from about 2% to about 7% by weight of the dispersion, water from about 0% to about 10% by weight of the dispersion, ethyl acetate from about 2% to about 5% by weight of the dispersion, and a gum from about 0% to about 0.01% by weight of the dispersion.

19. The method of claim 1, wherein the dispersion does not contain a dextrin.

20. The method of claim 12, wherein the dispersion does not contain a dextrin.

21. The method of claim 18, wherein the dispersion does not contain a dextrin.

22. The method of claim 18, wherein the dispersion does not contain a shellac.

23. The dispersion of claim 11, wherein the dispersion does not contain a shellac.

24. The dispersion of claim 11, wherein the gum is gellan gum.

25. The dispersion of claim 1, wherein the gum is gellan gum.

26. The dispersion of claim 12, wherein the gum is gellan gum.

27. The dispersion of claim 18, wherein the gum is gellan gum.

* * * * *